Sept. 18, 1934.  A. J. SCHOLTES  1,974,345
DOUBLE ACTION RELEASING TOOL HOLDER
Filed May 18, 1934  2 Sheets-Sheet 1
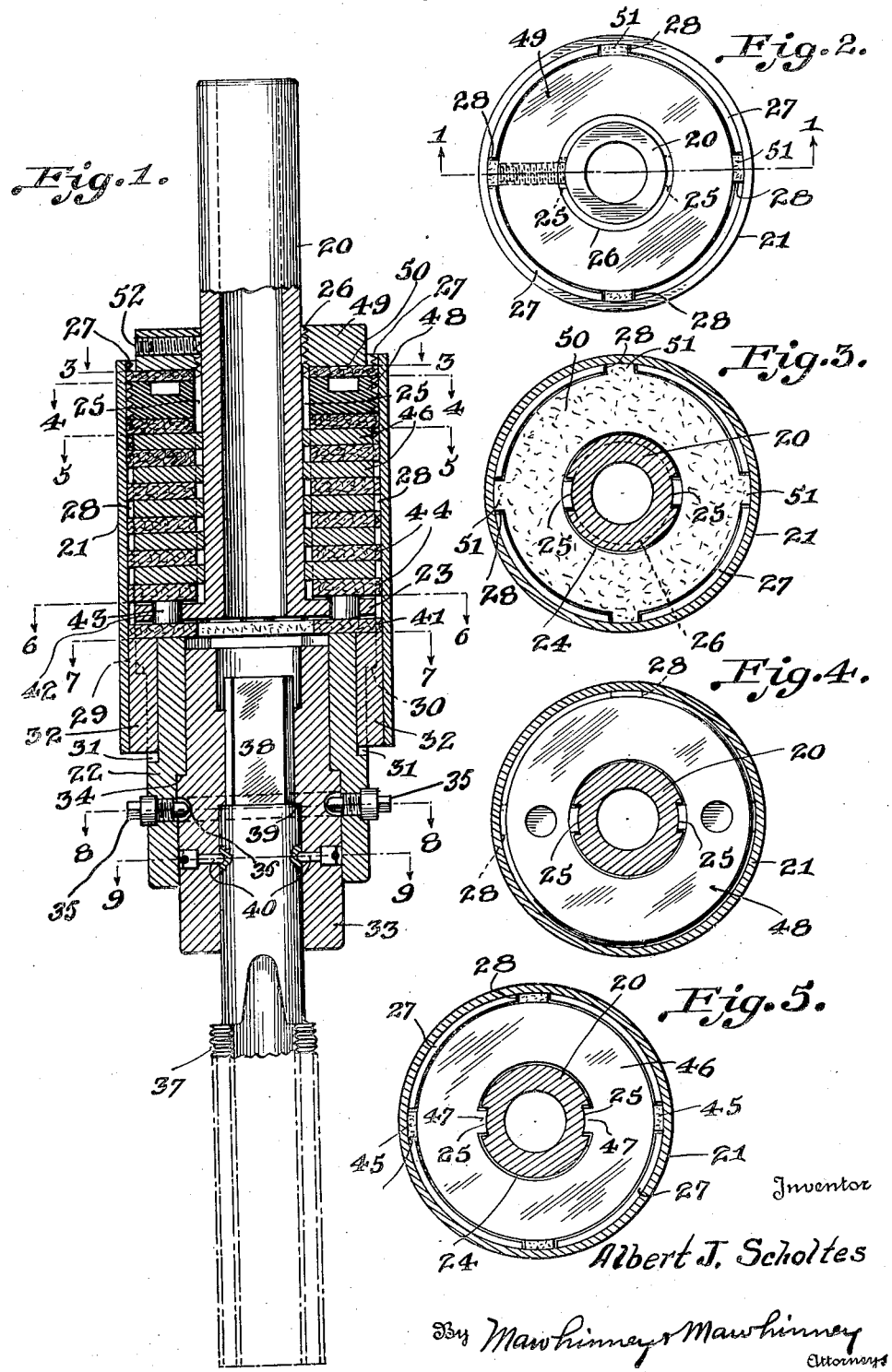
Inventor
Albert J. Scholtes
By Mawhinney & Mawhinney
Attorneys Sept. 18, 1934.  A. J. SCHOLTES  1,974,345
DOUBLE ACTION RELEASING TOOL HOLDER
Filed May 18, 1934  2 Sheets-Sheet 2
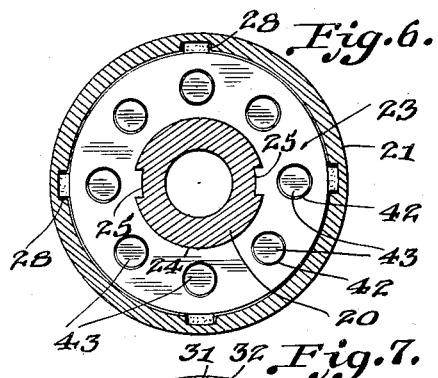
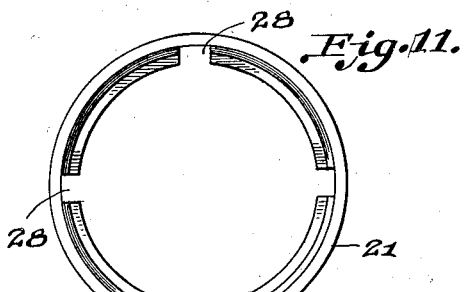
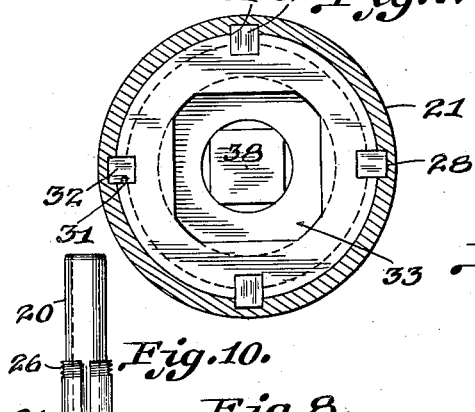
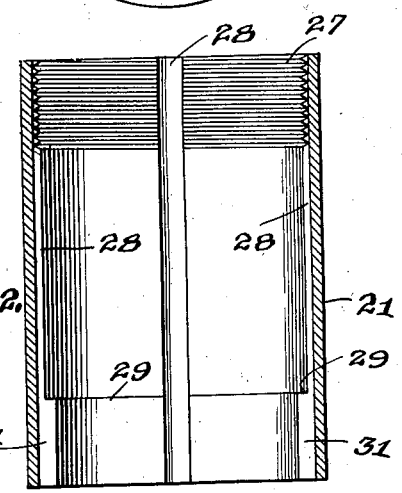
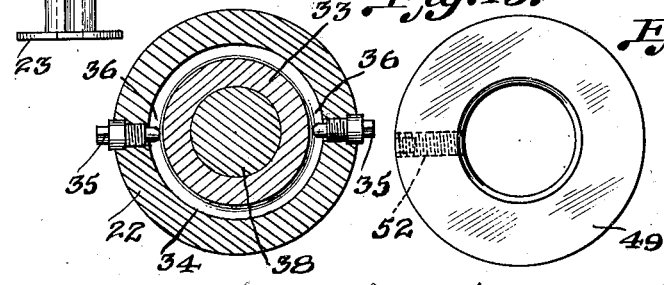
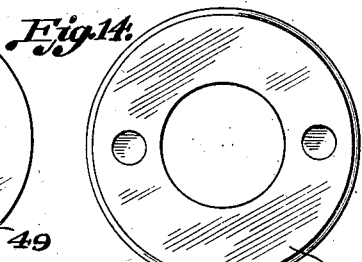
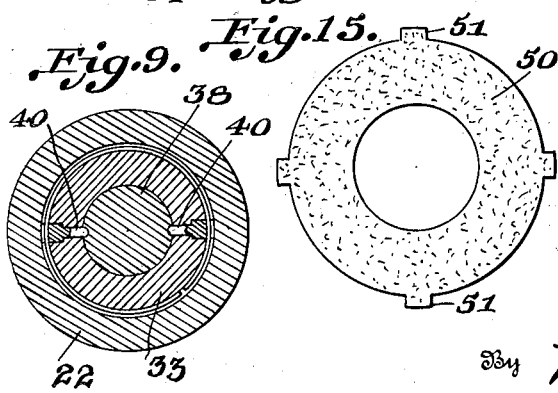
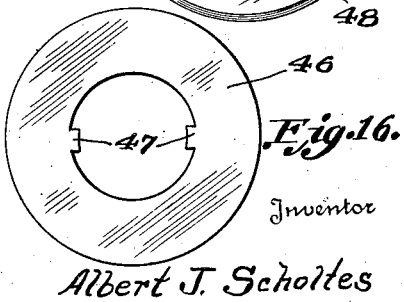
Inventor
Albert J. Scholtes
By Mawhinney & Mawhinney
Attorneys Patented Sept. 18, 1934

1,974,345

UNITED STATES PATENT OFFICE 1,974,345

DOUBLE ACTION RELEASING TOOL HOLDER

Albert J. Scholtes, Baltimore, Md.

Application May 18, 1934, Serial No. 726,407

8 Claims. (Cl. 10—136)

The present invention relates to tool holders of the type adapted to hold in drill presses, screw machines and the like, taps, round dies, reamers, counterbores, stud setters and nut setters, hollow mills, acorn die adapters and the like.

An object of the present invention is to provide a tool holder of this type which embodies a clutch of preferably the friction type, and which has a double action relative to the releasing of the tool engaging part so that at the end of the advance operation the tool engaging part is released to prevent injury to the work and to the tool, and wherein upon the reversal of the feed the clutch will take up the tool engaging part and reversely drive the same for withdrawing the tool relatively to the work.

Among various other advantages and features of the present invention is to provide a tool holder by use of which the tools may be quickly and easily interchanged, which has a free floating feature, wherein taps and dies may follow their own lead, which has a hollow shank for straight through threading where a straight shank is used, which releases the tool without shock thereto, which will tap or thread both right and left hand thread without reversing the mechanism of the tool holder, and wherein the release of the tool is instant and without shock, and wherein bottom tapping may be done without coming into contact with the bottom of the hole.

Further, the invention provides a double action releasing tool holder capable of adjustment for taking up wear, which allows the tool to slip before the breaking point is reached, which is operable on hand screw machines, automatic machines, drill presses, in tail stocks of lathes, and which may also be used on air and electric hand tools, and a tool holder which may be used on live spindles in connection with reversible tapping devices, which does not require continual adjustment as the only adjustment required is to take up wear and which has a minimum of overhang from turret when used on screw machines.

Various attempts have heretofore been made in the tool holder art to protect the work and tools when the feed engages the stop but in these attempts friction clutches and automatic throw-out devices have been used which are hard to regulate or adjust and which are not capable of taking up the connection of the tool after the same has been released and for reverse operation in withdrawing the tool from the work.

It is therefore a purpose of this invention to provide a tool with a supporting shank and a sleeve or the like for carrying a tool and to provide a friction clutch between these elements which normally releases the elements one from the other but which will take up through the clutch the drive or connection between the elements when an axial thrust or pull is exerted between the elements themselves.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal central section taken through a double action releasing tool holder constructed according to the present invention, the section being taken on the line 1—1 of Figure 2.

Figure 2 is an inner end view of the tool, showing the attaching shank.

Figure 3 is a transverse section taken through the inner end portion of the tool on the line 3—3 of Figure 1 showing the friction disc between the spaced stop nuts of the tool.

Figure 4 is a like view on the line 4—4 of Figure 1 showing the stop nut on the outer clutch portion of the tool.

Figure 5 is a similar view on the line 5—5 of Figure 1 showing one of the clutch discs carried by the shank or attaching part of the tool.

Figure 6 is a transverse section taken through the intermediate portion of the tool on the line 6—6 of Figure 1, showing the shank head and the clutch take-up pins mounted therethrough.

Figure 7 is a similar view on the line 7—7 of Figure 1, showing the endwise shiftable tool supporting sleeve mounted in the outer end of the clutch casing.

Figure 8 is a transverse section taken through the outer end of the clutch sleeve on the line 8—8 of Figure 1, showing the locking means for holding the socket in the sleeve.

Figure 9 is a similar view on the line 9—9 of Figure 1 showing the tool holding means for supporting a tool shank in the socket.

Figure 10 is a detail side elevation, on a reduced scale, of the supporting shank of the tool.

Figure 11 is a detail inner end elevation of the clutch casing.

Figure 12 is a longitudinal section through the same.

Figure 13 is a detail face view of the stop nut adapted to be mounted on the tool shank.

Figure 14 is a like view of the stop nut adapted to be mounted in the inner end of the clutch casing.

Figure 15 is a detail face view of the fiber disc or washer interposed between the stop nuts of Figures 13 and 14, and Figure 16 is a detail face view of one of the friction washers carried by the tool shank.

With reference now to the drawings, the tool essentially comprises a shank 20, a clutch casing 21 concentrically disposed in spaced relation about the shank and a tool supporting sleeve 22 which is mounted in the clutch casing. The shank 20, as best shown in Figures 1 and 10, comprises a hollow tubular body having an axial opening extending entirely through the same and of suitable size for receiving a suitable threading straight shank therethrough. The inner end of the shank 20 is adapted to be mounted in a turret or other suitable tool holder support depending upon the use and application of the device of the invention. The outer or other end of the shank 20 is provided with a disc head 23 which is of suitable size to slidably fit in the clutch casing 21 and to have free rotary movement therein. The outer end of the shank 20 adjacent the head 21 is provided with an enlarged portion 24 in the opposite sides of which are cut or otherwise suitably formed keyways 25 extending from the inner side of the head 23 through the inner end of the enlargement 24, and the enlargement 24 is provided at its inner end with an exteriorly screw threaded portion 26.

The clutch casing 21, as best shown from Figures 1, 11 and 12 comprises a cylindrical body having internal screw threads 27 at its inner end and provided in its opposite side walls with internal keyways 28 which may extend throughout the entire length of the cylindrical body or casing 21. The casing 21 is provided near its lower end with an internal shoulder 29 which may be formed by thickening the lower portion of the wall of the casing 21, as shown to advantage in Figure 12, to provide a stop shoulder for the tool carrying sleeve 22.

As shown in Figures 1 and 7, the tool carrying sleeve 22 has a longitudinal sliding fit in the outer end of the clutch casing 21 and is provided with an annular enlargement or shoulder 30 at its inner end which faces outwardly and is adapted to abut the shoulder 29 for limiting the outward movement of the sleeve 22. The sleeve 22 is also provided in its opposite outer sides with longitudinal keyways 31 adapted to register with the outer ends of the keyways 28 in the clutch casing 21 to receive therewith locking keys 32 which hold the sleeve 22 from turning in the clutch casing 21 but which are of less length than the keyways 31 in the sleeve 22 so that the sleeve has a limited longitudinal reciprocating movement. A socket 33 is fitted in the outer end of the sleeve 22 and projects slightly from its forward end and extends substantially throughout the entire length of the sleeve 22, a seating shoulder 34 being provided within the sleeve 22 for receiving a correspondingly stepped or shouldered portion of the socket 33 to firmly hold the latter in the sleeve.

Threaded pins 35 are threaded through the opposite walls of the sleeve 22 and at their inner ends engage in a suitable recess or pocket 36 provided in the exterior surface of the socket 33 for interlocking the socket 33 within the sleeve 22 and the inner end of the socket or collet 33 is non-circular exteriorly to fit in a correspondingly formed opening in the sleeve 22 to hold the sleeve 22 and collet 33 from relative rotation. The socket 33 may be of any suitable configuration or construction for carrying the desired tool and in the present instance the socket 33 is illustrated as carrying a tap 37. The tap 37 has a non-circular shank 38 which fits into a correspondingly formed opening in the socket 34 and is also suitably stepped to engage a shoulder 39 formed within the socket 33, spring-pressed retaining pins 40 are mounted in the socket 33 for engagement in registering openings or depressions formed in the shank of the tap 37. The sleeve 22 therefore rigidly carries the tool 37 so that the sleeve 22 may be moved in and out of the casing 21 to a limited extent upon pressure on the tap in either direction.

A friction washer 41, similar to that shown in Figure 15, is interposed between the shank head 23 and the inner end of the sleeve 22 and, as shown in Figures 1 and 6, the shank head 23 is provided with a plurality of openings 42 therethrough arranged in a circular row in the head and through which are freely slidable a corresponding number of clutch take-up pins 43. The outer ends of the pins 43 rest against the packing or friction washer 41 while the inner ends of the pins 43 bear against the adjacent disc of the friction clutch.

The clutch casing 21 carries a plurality of fiber discs 44 which freely surround the shank 20 but which are provided at their peripheral portions with radially extending tongues or keys 45 slidably engaging in the keyways 28 of the clutch casing 21. Interposed between these fiber discs 44 are metal discs 46 which freely rotate within the casing 21 but which are provided at their inner marginal edges with inwardly projecting tongues or keys 47 which slidably engage in the keyways 25 of the shank 20. The metal discs 46 are interposed between the fiber discs 44 in alternate order so that when these discs 44 and 46 are crowded together by pressure from either end of the series of discs, the clutch is closed or connected and when these discs are relieved of the pressure the clutch is open so that the shank 20 and the clutch casing 21 are free of each other as to rotation. The pins 43 which are carried by the shank head 23 are of slightly greater length than the thickness of the head 23 so that upon inward movement of the sleeve 22 the pins may compress the clutch discs to engage the clutch before the sleeve 22 comes into frictional contact, through the washer or disc 41, with the shank 20 and its head 23.

To serve as a stop or abutment for the inner end of the clutch discs when compressed by the pins 43, a stop nut 48 is threaded into the inner end of the clutch casing 21 and turned up to the desired extent for holding the clutch discs in position to be engaged upon pressure and to be released when relieved of the pressure, such pressure being exerted through the pins 43.

The shank 20 with its head 23 has a limited free play through the clutch discs as the clutch pins 43 are of greater length than the thickness of the head 23, and to limit this free play of the shank 20, the latter is provided with a stop nut 49 which is threaded on the threaded portion 26 of the shank 20 and which is turned up toward the stop nut 48 of the casing 21. A friction washer or disc 50, best shown in Figure 15, and similar to the washer 41, is mounted in the upper end of the clutch casing 21 and has radially projecting tongues or keys 51 which enter the keyways 28 of the casing 21, in a manner similar to that of the washer 41. This stop nut 41 may be fixed upon the shank 20 by a set screw 52 or the like which is threaded radially inward through one side of the stop nut 49, as shown in Figure 1.

It is well known that when a tool is used in a drill press the spindle revolves and the work remains stationary. When the tool is used in a screw machine, however, the tool stands still and the work revolves. When this tool holder is mounted on a screw machine, the shank 20 of the tool holder is clamped in the turret of the screw machine and the turret, being mounted on a saddle in the usual manner slides forwardly toward the work and thence slides backwardly from the work during the operation of the machine.

The saddle which carries the turret is limited in its forward motion by a stop which is adjustable and which permits the tool in the tool holder to advance the desired distance into the work. In tapping a hole, when the tap, such as 37 in the present instance, comes into contact with the work a slight pressure on the handle of the machine controlling the advance of the turret, will build up the desired friction in the tool holder, causing the tap 37 to remain stationary while it is advancing and cutting into the work. When the saddle reaches the stop of the machine the tap 37 continues to cut just far enough to draw the holder apart or draw the sleeve 22 forwardly to release the pressure on the friction discs 44 and 46 so that the tap 37 revolves with the work and is in a neutral position relative to the cutting or boring operation. The screw machine is now reversed so that the work recedes from the tool holder. This operation builds up friction so that the tap 37 is again held stationary by the clutch while the work revolves so that the tap is screwed out of the work or thread that has been cut by the tap and without damage to the tool or the work. In this manner the machine may be set by its stops so that the tap 37 can be stopped from cutting before the bottom of the hole to be tapped is reached, and still not come in contact with the bottom of the hole in the work which would otherwise destroy the seat in the bottom of the hole.

If other tools than taps are used, such as drills, reamers and the like, it is unnecessary to reverse the machine as the stop on the turret and saddle of the machine are only set to measure the depth the tool will cut. In this case, if the drill or reamer should become clogged or strike an obstruction in the work, the friction clutch will slip before the drill or reamer will break.

The operation of the clutch during the above actions is as follows:—

When the shank 20 is held stationary in the turret or the like, a thrust pressure on the tool causes the sleeve 22 to press against the first fiber disc 41 which bears against the clutch pins 43, and these pins in turn compress or bind the clutch discs 44 and 46 together with the stop nut 48 serving as a counter pressure for closing the clutch. This builds up the necessary friction in the tool holder so as to hold the sleeve 22 with its tap 37 or other tool stationary relatively to the shank 20. The work may now revolve about the tap 37 which causes the tap to thread a hole in the work and this threading or cutting continues until the pressure or thrust directed against the shank 20 is stopped by the limit of advancement of the turret and saddle.

At this point of the operation, the lead of the tap 37 pulls the sleeve 22 outwardly relative to the clutch casing 21 and releases the clutch discs so that the tool holder is then in neutral position, the tap 37 turning with the work and the threading and cutting being discontinued.

When the machine is reversed, the tap 37, the sleeve 22 and the casing 21 with its fiber discs 44 and its stop nut 48 are turned in an opposite or reverse direction. The backward movement of the saddle with its turret causes the shank 20 to pull away from the work and the flange or head 23 of the shank is drawn against the clutch discs 44 and 46, again building up friction in the clutch. When the clutch is closed, the tap 37, clutch casing 21 and the sleeve 22 with its parts are held rigid to the shank 20 and stop revolving but as the work continues to revolve the work will be unscrewed from the tap 37. It will be noted that the sleeve 22 is slidably mounted by means of the keys 32 within the clutch casing 21 and that the movement of the sleeve in and out of the casing 21 sets up the desired friction to close the clutch and also releases it.

It is obvious that various changes and modifications may be made in the details of construction and design of the above specifically described embodiment of this invention without departing from the spirit thereof, such changes and modifications being restricted only by the scope of the following claims.

What is claimed is:—

1. A double action releasing tool holder, comprising a shank, a tool supporting sleeve, a friction clutch between the shank and the sleeve, forward take-up means for the clutch operable upon pressure to retract the sleeve for connecting the sleeve to the shank, and reverse take-up means for the clutch operable upon pressure to extend the sleeve for interconnecting the sleeve and shank, one of said take-up means having a greater amplitude of movement than the other take-up means to release the clutch and free the sleeve when the pressures are relieved.

2. A double action releasing tool holder, comprising a clutch, a supporting shank connected to the clutch with a limited longitudinal play, and a tool supporting sleeve connected to the clutch with a limited longitudinal play, said clutch adapted to interlock a shank and sleeve upon the take-up of said play between the clutch and the supporting shank and between the sleeve and the clutch.

3. A double action releasing tool holder, comprising a shank having a flange on its outer end, a clutch casing enclosing the shank and the flange, a plurality of alternately disposed clutch discs carried by the shank and the casing, a stop nut mounted in the inner end of the casing against said discs to dispose the same between the stop nut and the shank flange whereby upon axial inward movement of the shank said clutch discs are compressed, a sleeve slidably mounted in the outer end of said casing beyond the shank, and disc compressing means independent of said flange disposed between the sleeve and said discs for compressing the same against said stop nut.

4. A double action releasing tool holder, comprising a friction clutch having a plurality of friction discs therein, an axially movable shank disposed in said clutch and having disc compressing means operable upon axial movement of the shank in one direction and adapted to release the discs upon movement in the opposite direction, a tool carrying sleeve axially movable relative to the clutch and a second disc compressing means operable independently of the disc compressing means of the shank for compressing said discs together when the sleeve is moved axially in one direction relative to the clutch and for releasing the discs when the sleeve is moved in the opposite direction.

5. A double action releasing tool holder, comprising a friction clutch having friction discs therein, a shank axially movable relative to the clutch, disc clamping means carried by the shank for binding the discs together upon axial movement of the shank in one direction and for releasing the discs when moved in an opposite direction, a sleeve adapted to carry a tool and axially movable relative to the shank, and independent clutch compressing means carried by the shank and having greater amplitude of movement within the disc compressing means of the shank adapted to bind said discs together upon the movement of the sleeve in one direction relative to the shank and to release the discs when the sleeve is moved in an opposite direction.

6. A double action releasing tool holder, comprising a clutch casing, a shank disposed axially in the casing and adapted for axial movement therein and having a head flange in the casing, a stop nut mounted in the casing spaced from said head flange of the shank, a plurality of clutch discs in the casing alternately keyed to the casing and to the shank and adapted to be compressed by axial movement of the shank in one direction and to be released by movement of the shank in an opposite direction, a tool carrying sleeve slidably keyed in the casing beyond the shank, and disc compressing means disposed between the sleeve and the adjacent clutch disc and being of greater length than the thickness of said head flange to admit free play thereof between the sleeve and the adjacent clutch disc without compressing the latter to provide a neutral released position for the clutch between the shank and the sleeve.

7. A double action releasing tool holder, comprising a clutch casing, a shank axially disposed and movable in the casing and having a head flange within the casing, a stop nut carried by the casing in spaced relation to said flange, a second stop nut mounted on the shank outwardly of the stop nut in the casing for adjustment to limit the axial movement of the shank in the casing, a plurality of clutch discs alternately keyed to the casing and the shank adapted to be compressed between said flange and the stop nut of the casing upon outward axial movement of the shank, a longitudinally shiftable sleeve keyed in said casing beyond the shank and adapted to carry a tool, and a plurality of clutch pins slidably mounted in said head flange of the shank and being of greater length than the thickness of the head flange, said pins disposed between said sleeve and the adjacent clutch disc for compressing the clutch discs together upon inward movement of the sleeve independently of the axial movement of the shank to provide a neutral clutch releasing position during the change in direction of the turning of the tool holder.

8. A double action releasing tool holder, comprising a clutch casing, a shank slidably mounted in one end of the casing and having a head flange at its inner end, a sleeve slidably keyed in the other end of the casing coaxially with the shank, said shank and sleeve being independently slidable in the casing, a plurality of clutch discs alternately keyed to the casing and the shank and disposed between said flange and the inner end of the clutch casing, a stop nut carried by the casing to engage the adjacent friction disc, a second stop nut carried by the shank for engagement with the first stop nut to limit the inward axial movement of the shank, said shank adapted to be moved axially outward of the casing against said discs to compress the same independently of the movement of said sleeve, a friction disc carried on the inner end of said sleeve, and a plurality of clutch pins slidably mounted through said flange of the shank and being of greater length than the thickness of the flange and disposed between said friction disc of the sleeve and adjacent friction disc of the clutch for compressing the clutch discs upon inward movement of the sleeve independently of the movement of the shank.

ALBERT J. SCHOLTES.